(12) United States Patent
Kong et al.

(10) Patent No.: US 10,800,238 B2
(45) Date of Patent: Oct. 13, 2020

(54) LAMINATED GLASS DISPLAY FOR VEHICLE

(71) Applicant: HYUNDAI MOTOR COMPANY, Seoul (KR)

(72) Inventors: Nak Kyoung Kong, Seongnam-si (KR); Keon Soo Jin, Ulsan (KR); Jong Min Park, Seoul (KR); Ki Hong Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 587 days.

(21) Appl. No.: 15/720,955

(22) Filed: Sep. 29, 2017

(65) Prior Publication Data

US 2018/0111464 A1    Apr. 26, 2018

(30) Foreign Application Priority Data

Oct. 24, 2016    (KR) .................... 10-2016-0138465

(51) Int. Cl.
```
B32B 15/04      (2006.01)
B32B 17/06      (2006.01)
B60J 10/70      (2016.01)
B60J 10/34      (2016.01)
B32B 17/10      (2006.01)
B60J 1/02       (2006.01)
E06B 3/54       (2006.01)
G02B 27/01      (2006.01)
B60R 11/00      (2006.01)
```

(52) U.S. Cl.
CPC ............. *B60J 10/70* (2016.02); *B32B 17/061* (2013.01); *B32B 17/1055* (2013.01); *B60J 1/02* (2013.01); *B60J 10/34* (2016.02); *E06B 3/54* (2013.01); *G02B 27/0101* (2013.01); *B60R 2011/0026* (2013.01); *G02B 2027/0194* (2013.01)

(58) Field of Classification Search
USPC .................... 428/426, 428, 432, 434, 688
See application file for complete search history.

(56) References Cited

U.S. PATENT DOCUMENTS

| | | | |
|---|---|---|---|
| 6,293,609 B1 | 9/2001 | Xu et al. | |
| 2015/0165965 A1* | 6/2015 | Masaki | B60Q 3/745 362/513 |

FOREIGN PATENT DOCUMENTS

| | | |
|---|---|---|
| JP | 07-257169 A | 10/1995 |
| JP | 2003-167230 A | 6/2003 |
| KR | 10-1992-0004870 | 11/1991 |
| KR | 20-1998-044648 | 9/1998 |

(Continued)

*Primary Examiner* — Lauren R Colgan
(74) *Attorney, Agent, or Firm* — McDonnell Boehnen Hulbert & Berghoff LLP

(57) ABSTRACT

Provided is a laminated glass display for a vehicle, in which the wiring harness between a display part and a vehicle body is not exposed. The display part is resistant to environmental factors such as moisture. To this end, the laminated glass display for a vehicle includes a plurality of adhesive films sequentially located between an upper laminated glass and a lower laminated glass having a recess in an end adjacent to a vehicle body panel; a display part located between the adhesive films; a dampener facing the upper laminated glass and located in the recess; and a molding disposed between the dampener and the vehicle body panel.

10 Claims, 3 Drawing Sheets

(56) References Cited

FOREIGN PATENT DOCUMENTS

| KR | 10-2010-0120120 A | 11/2010 |
|----|-------------------|---------|
| KR | 10-2013-0048864   | 5/2013  |
| KR | 10-1349019        | 1/2014  |
| KR | 10-2016-0114058   | 1/2015  |
| WO | 2009-086870 A1    | 7/2009  |

* cited by examiner

LAMINATED GLASS DISPLAY FOR VEHICLE

CROSS-REFERENCE TO RELATED APPLICATION

This application claims under 35 U.S.C. § 119(a) the benefit of priority to Korean Patent Application No. 10-2016-0138465 filed on Oct. 24, 2016, the entire contents of which are incorporated herein by reference.

BACKGROUND

(a) Technical Field

The present disclosure relates to a laminated glass display for a vehicle. More particularly, it relates to a laminated glass display for a vehicle, which includes a plurality of adhesive films arranged between upper and lower laminated glasses and a display part located between the adhesive films so that the display part is sealed by the adhesive films and the laminated glass display is configured adjacent to a vehicle body panel so as to be connected to a vehicle body through wiring.

(b) Background Art

In recent years, the techniques for mounting a display on a glass have been in the spotlight in order to improve driving environments and display vehicle information and path information on a screen.

Moreover, a variety of glass displays to display simple vehicle information and image information from a camera monitoring system ("CMS") and to display side or rear images in place of vehicle mirrors have been frequently studied.

In addition, techniques for mounting a display into a glass have been studied to display environments around the vehicle or visual information for the convenience of a user or to project images requested by the user.

However, because in conventional systems a separate component is attached to the outermost surface of a laminated glass, the appearance of the vehicle may be aesthetically diminished due to the exposure of wiring for connecting the display to the vehicle body. In addition, noise may be caused due to the vibration of the vehicle and the separate component may be vulnerable to moisture.

In addition, the installation of the display in places other than the glass may affect the package layout of drive parts, and may cause driver inconvenience because of interrupting the forward view when the vehicle is being driven.

FIG. 1 illustrates a conventional heads-up display of a vehicle. The heads-up display of the vehicle is configured such that a pattern film is inserted between laminated glasses having a hollow formed therebetween and is bonded thereto in a vacuum state.

However, although the above technique discloses a display which is merely maintained in a vacuum state and is formed in a film form, and does not disclose wiring connected to the display located between the laminated glasses. In addition, the above technique does not provide a separate means for absorbing shocks and removing noise occurring between the upper and lower laminated glasses.

The above information disclosed in this Background section is only for enhancement of understanding of the background of the invention and therefore it may contain information that does not form the related art that is already known in this country to a person of ordinary skill in the art.

RELATED ART DOCUMENT

Patent Document (Patent Document 1) Korean Patent No. 10-1349019

SUMMARY OF THE DISCLOSURE

The present disclosure addresses the above-described problems associated with the related art.

In one aspect, the present disclosure provides a laminated glass display for a vehicle, in which the wiring harness between a display part and a vehicle body is not exposed.

In another aspect, the present disclosure provides a laminated glass display for a vehicle, including a display part which is located inside a laminated glass and is resistant to environmental factors such as moisture.

In a further aspect, the present disclosure provides a laminated glass display for a vehicle, in which one surface of a laminated glass is coated with ceramic or metal such that a display part located between upper and lower laminated glasses is protected from external shocks.

Additional advantages, objects, and features of the invention will be set forth in part in the description which follows and in part will become apparent to those having ordinary skill in the art upon examination of the following or may be learned from practice of the invention. The objectives and other advantages of the disclosure may be realized and attained by the structure particularly pointed out in the written description and claims hereof as well as the accompanying drawings.

The above and other objects can be accomplished by the provision of a laminated glass display for a vehicle.

In a preferred embodiment, a laminated glass display for a vehicle includes a plurality of adhesive films sequentially located beneath an upper laminated glass; a display part located between the adhesive films; a lower laminated glass located beneath the adhesive films, the lower laminated glass having an opening portion formed at one end thereof adjacent to a vehicle body panel; a dampener facing the upper laminated glass and located at the opening portion, and a molding configured to connect the dampener to the vehicle body panel.

The dampener may include an insulated buffer formed at one end thereof so as to be adjacent to the lower laminated glass.

The dampener may include a plurality of protrusions located adjacent to the upper laminated glass.

The display part may be electrically connected to the vehicle through a wiring harness located between the vehicle body panel and a head lining.

An inner surface of the upper laminated glass contacting the dampener may be coated with a metal film.

The laminated glass display may further include a sealant between the vehicle body panel and the dampener.

An inner surface of the upper laminated glass may be coated with a metal film.

The metal film may be an oxide film made of at least one metal of aluminum (Al), tin (Sn), zinc (Zn), and lead (Pb).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features and aspects of the disclosure are discussed below.

BRIEF DESCRIPTION OF THE DRAWINGS

The above and other features of the present disclosure are described in detail with reference to certain exemplary embodiments thereof illustrated in the accompanying drawings which are given hereinbelow by way of illustration only, and thus are not intended to limit the present disclosure, and wherein.

Figure 1:
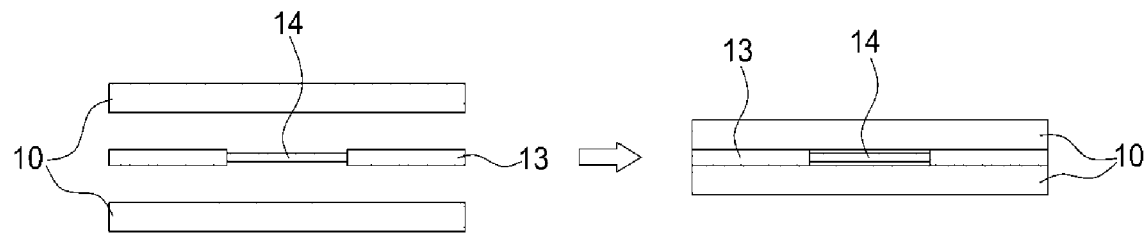
FIG. 1 is a cross-sectional view illustrating a conventional laminated glass for a vehicle including a head-up display.

It should be understood that the appended drawings are not necessarily to scale, presenting a somewhat simplified representation of various preferred features illustrative of the basic principles of the invention. The specific design features of the present disclosure as described herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION OF THE EMBODIMENTS

Hereinafter reference is now made in detail to various embodiments of the present disclosure, examples of which are illustrated in the accompanying drawings and described below. While the disclosure is described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure provides a technique related to a laminated glass 100 having a plurality of layers, wherein a display part 140 is located between the layers.

Display part 140 located between the layers of the laminated glass 100 may be an Liquid Crystal Display ("LCD"); a Flat Panel Display ("FPD") such as an Organic Electro Luminescence Display ("OELD") or a Plasma Display Panel ("PDP"), a miracle glass display, an Organic Light Emitting Diode ("OLED"), or the like.

In an example embodiment, display part 140 is an OLED, which is thin and allows the laminated glass to be curved.

Figure 2:
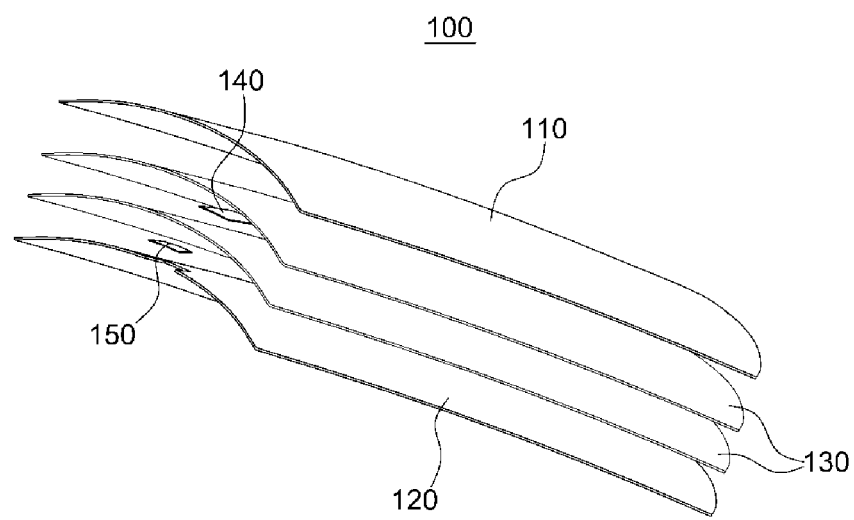
FIG. 2 is a view illustrating constituent layers of a laminated glass display for a vehicle according to an example embodiment of the present disclosure.

FIG. 2 illustrates the constituent layers of the laminated glass display for a vehicle according to an example embodiment of the present disclosure.

As illustrated in FIG. 2, in an example embodiment, laminated glass 100 comprises an upper laminated glass 110 facing the outside of a vehicle, a plurality of adhesive films 130, a display part 140 located between the adhesive films 130, and a lower laminated glass 120 facing the inside of the vehicle.

Adhesive films 130 are inserted into laminated glass 100 to bond the upper and lower laminated glasses 110 and 120, and each adhesive film is made of a material resistant to penetration and shocks for safety of the vehicle.

Adhesive films 130 may be made of polyethylene terephthalate ("PET"), polyethylene ("PE"), polybutylene terephthalate ("PBT"), polyvinyl chloride ("PVC"), polyethylene naphthalate ("PEN"), ethylene vinyl acetate ("EVA"), polycarbonate ("PC"), polyvinyl alcohol ("PVOH"), polypropylene ("PP"), ionomer ("10"), polymethylpentene ("PMP"), polystyrene ("PS"), polyvinylidene chloride ("PVDC"), poly(methyl methacrylate) ("PMMA"), ethylene vinyl alcohol ("EVOH"), ethylene-acrylic acid ("EAA"), ethylene-methyl methacrylate ("EMMA"), ethylene-methyl acrylate ("EMA"), ethylene methacrylic acid ("EMAA"), ethylene-ethyl acrylate ("EEA"), polyacrylonitrile ("PAN"), polyphenylene sulfide ("PPS"), polyphenylene ether ("PPE"), polyestersulfone ("PES"), polyetheretherketone ("PEEK"), polytherimide ("PEI"), polyamide-Imide ("PAI"), polyimide ("PI"), polymer alloy, cellophane, polyamide ("PA"), nylon, or the like.

Preferably, adhesive film 130 is made of polyvinyl butyral ("PVB").

Because laminated glass 100 uses two or more adhesive films 130, the flexible display part 140 is located between the adhesive films 130 and is sealed to prevent the introduction of moisture thereinto. Because display part 140 is sealed between adhesive films 130 when adhesive films 130 are pressed against each other, the display part may be maintained in a vacuum state.

In an example embodiment of the present disclosure, laminated glass 100 is prepared by roller pressing; however, laminated glass 100 may be prepared by pressing using pressure plates, by vacuum pressing, or by adhesive application pressing. Display part 140 sealed between adhesive films 130 must have a heat resistance sufficient to withstand temperature equal to or greater than that generated when adhesive films 130 are rolled, pressed or otherwise bonded. In the example embodiment where display part 140 is an OLED, display part 140 preferably withstands temperatures of 80° C. or more.

Flexible display part 140 located between adhesive films 130 may be curved depending on the shape of laminated glass 100.

Unlike upper laminated glass 110, lower laminated glass 120 has a recess 121 formed at one end thereof connected to the vehicle body.

When the laminated glass 100 is pressed, the upper laminated glass 110 or the adhesive film 130 is exposed to the interior of the vehicle through recess 121 in lower laminated glass 120.

Recess 121 may have a U-shape, where the opening of the U faces the vehicle body panel and the U extends away from the vehicle body panel.

In addition, laminated glass display 100 includes a dampener 150 located at opening portion 121. Dampener 150 may be flush with lower laminated glass 120. In addition, dampener 150 may include a buffer 152 at a position facing the lower laminated glass 120.

Figure 4:
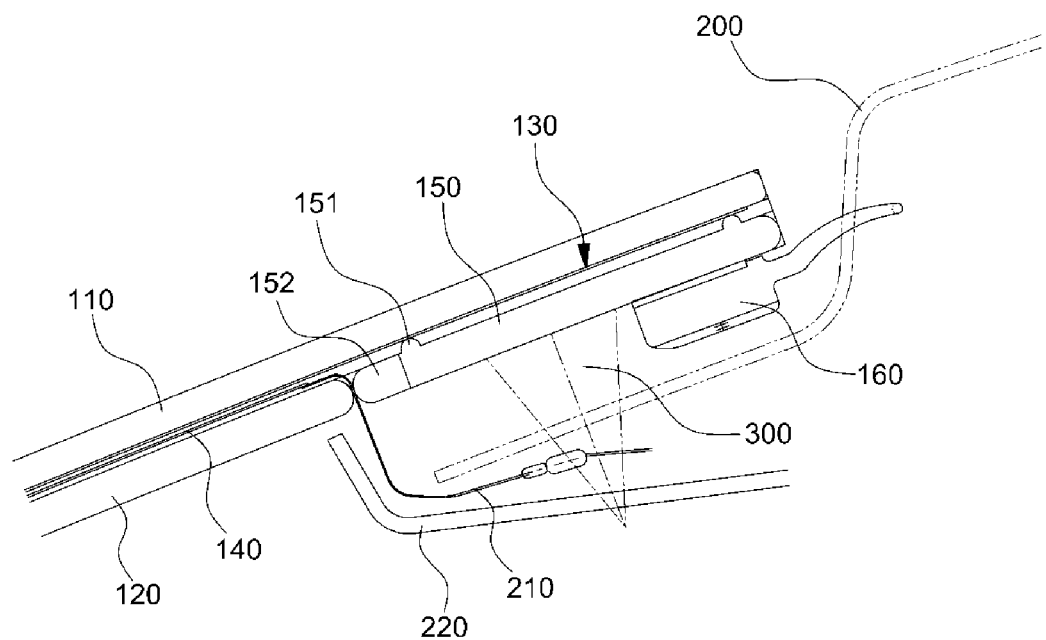
FIG. 4 is a cross-sectional view illustrating the laminated glass display for a vehicle facing a vehicle body according to an example embodiment of the present disclosure.

As shown in FIG. 4, a wiring harness 210 for providing an electric current to display part 140 extends between buffer 152 and lower laminated glass 120. Buffer 152 is therefore preferably made of an insulating material. More preferably, buffer 152 coming into contact with wiring harness 210 is made of an electric insulating material.

In addition, a portion of buffer 152, which faces lower laminated glass 120, may be curved in order to prevent damage to wiring harness 210.

Dampener 150 also may include at least one protrusion 151 facing upper laminated glass 110 or adhesive film 130, allowing dampener 150 to absorb shocks applied to upper laminated glass 110.

The inner surface of upper laminated glass 110 may be coated with a ceramic or metal oxide film. Because wiring harness 210 is located in a portion of the upper laminated glass 110 corresponding to dampener 150, the inner surface of upper laminated glass 110 is preferably coated with metal.

Upper laminated glass 110 coated with metal may have a transmittance of 70% or more. Upper laminated glass 110 also preferably reflects sunlight to prevent display part 140 or wiring harness 210 in laminated glass 100 from overheating.

In an example embodiment of the present disclosure, any metal having a melting point less than or equal to 700° C. may be used to coat upper laminated glass 110. For example, upper laminated glass 110 may be coated with an oxide film made of one or more alloys selected from the group consisting of aluminum (Al), tin (Sn), zinc (Zn), and lead (Pb). Particularly, lightweight aluminum having a low melting point is preferably used as the oxide film.

It is possible to increase conductivity using various types of molten metal in addition to molten Al metal. A metal having a low melting point is advantageous for coating and has high safety in manufacturing.

Because at least one portion of upper laminated glass 110 corresponding to dampener 150 is coated with metal, the area where wiring harness 210 is exposed to the outside may be minimized. In addition, because the at least one portion of the upper laminated glass 110 reflects sunlight, it is possible to prevent wiring harness 210 from malfunctioning.

Figure 3:
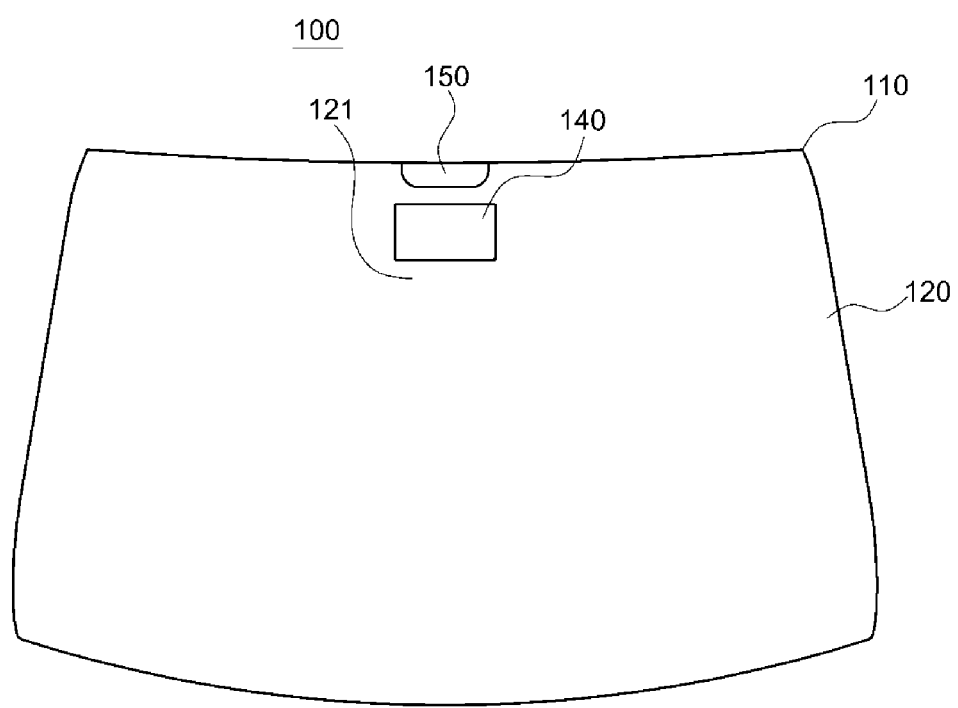
FIG. 3 is a view illustrating the laminated glass display for a vehicle including a display part according to an example embodiment of the present disclosure.

FIG. 3 illustrates the inner surface of the laminated glass display according to an example embodiment of the present disclosure.

In the example embodiment shown in FIG. 3, display part 140 is located on the inner upper surface of the vehicle, and, in particular, between upper laminated glass 110 and lower laminated glass 120. As also shown in FIG. 3, preferably, display part 140 is located below recess 121 of lower laminated glass 120. That is, recess 121 is formed at one end of lower laminated glass 120 facing a roof panel, and display part 140 is located beneath (i.e. farther away from the roof panel) recess 121.

FIG. 4 is a cross-sectional view illustrating the coupled state of the laminated glass display according to an example embodiment of the present disclosure.

Dampener 150 is disposed in recess 121 of lower laminated glass 120 as illustrated in FIG. 4. Dampener 150 is flush with lower laminated glass 120 and faces upper laminated glass 110 or an adhesive film 130.

Display part 140 is located beneath dampener 150, and serves as a vehicle mirror (e.g. side view or rear view mirror). Because images captured by a vehicle CMS may be displayed on display part 140, the present disclosure may obviate the need for separate components such as mirrors.

Because a captured rear image may be displayed on display part 140, in another example, display part 140 may be used as a display for a parking assistant system.

As illustrated in FIG. 4, display part 140 is located on the front laminated glass 100 for the vehicle-. As described above, two or more adhesive films 130 are located between upper laminated glass 110 and lower laminated glass 120, and display part 140 is located between the adhesive films 130.

Lower laminated glass 120 includes recess 121, and the inner portion of upper laminated glass 110 or adhesive film 130 is exposed through recess 121.

Dampener 150 is provided so as to correspond to the exposed upper laminated glass 110 or adhesive film 130. Dampener contacts with one end of recess 121 in lower laminated glass 120, and also contacts a portion or the entirety of the exposed upper laminated glass 110 or adhesive film 130.

Preferably, dampener 150 blocks noise or vibration where it comes into contact with upper laminated glass 110 or adhesive film 130 and absorbs shocks occurring in upper laminated glass 110. Dampener 150 facing upper laminated glass 110 or adhesive film 130 may include at least one protrusion 151.

Dampener 150 also may block noise and vibration occurring in lower laminated glass 120. In addition, dampener 150 may further include buffer 152 having elasticity in order to provide a space for wiring harness 210 for electric connection between display part 140 and the vehicle.

Because buffer 152 is configured to pass wiring harness 210 therethrough, buffer 152 may be configured to provide tension for fixing wiring harness 210. Buffer 152 may also be made of an electric insulating material in order to prevent electricity from being applied thereto through the ground of wiring harness 210. Buffer 152 may also be rounded at a position facing the lower laminated glass in order to prevent damage to wiring harness 210.

In addition, laminated glass display 100 includes a molding 160 in order to prevent foreign substances from being introduced into a space between dampener 150 and vehicle body panel 200. Molding 160 may be a weather strip type molding, and may surround the entirety of dampener 150 or upper laminated glass 110.

A hollow is formed between vehicle body panel 200 and dampener 150, and the inside of the hollow is treated using a sealant 300. Sealant 300 may be a gasket, a liquid adhesive, or an ointment adhesive that is used to prevent leakage between vehicle body panels 200 and dampener 150.

Display part 140 located between the vehicle body and the adhesive films 130 is connected to the vehicle by wiring harness 210, and wiring harness 210 is inserted into a gap between the head lining 220 of the vehicle and vehicle body panel 200.

Because wiring harness 210 connected to display part 140 extends between dampener 150 and head lining 220 of the vehicle, it is not exposed to the outside of the vehicle. Consequently, there is no need for a separate cover for wiring harness 210.

Because display part 140 is connected to the vehicle body through wiring harness 210, display part 140 may be supplied with electric power from the vehicle battery. Display part 140 may display an image according to the request of a user through a controller arranged in the vehicle.

Display part 140 may be a touch panel to allow setting and input information for the vehicle to be transferred to the vehicle from the display part 140 to control the vehicle through the input information.

Figure 5:
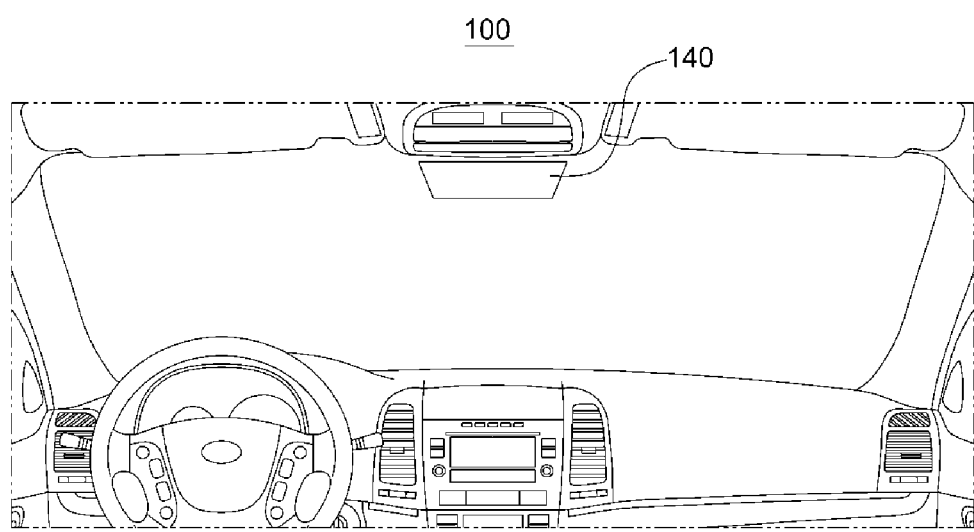
FIG. 5 is a view illustrating a vehicle to which the laminated glass display according to an example embodiment of the present disclosure is applied.

FIG. 5 illustrates an example embodiment of the laminated display glass of the present disclosure mounted in a vehicle.

Because the image captured by the CMS may be displayed in the space where a rearview mirror would traditionally be mounted, the separate rearview mirror may be removed.

The size, horizontal distance, vertical distance, and rotation of the displayed image may be adjusted by the controller of the vehicle. Typically, the image captured by a rear camera may be corrected and edited so as to be displayed as the same image as the view obtained through the separate rearview mirror.

In another example embodiment, the same view as the side mirror of the vehicle may be displayed as an image. Therefore, laminated glass 100 may be configured such that display part 140 is located on the side glass of the vehicle, in addition to front laminated glass 100.

As described above, in the laminated glass display for a vehicle according to an example embodiment of the present invention, display part 140 may be located in any portion of a vehicle glass adjacent to a vehicle body panel 200. Therefore, display part 140 is not limited to being located on the front laminated glass 100, and may be embodied in various forms according to the mass production environment of the vehicle.

As is apparent from the above description, the present disclosure provides the following advantages by the configuration, combination, and use relationship of components in example embodiments.

The laminated glass of the present disclosure improves the aesthetic appearance of a vehicle because the wiring harness between a display part located inside a laminated glass and the vehicle body is not exposed to the outside.

In addition, because the present disclosure provides a technique for preventing moisture from being introduced into the laminated glass owing to sealant and molding components included therein, it is possible to increase the durability of the display part.

In addition, because the present disclosure includes various shock absorbing structures for removing vibrations transferred to the display part, it is possible to increase the durability of the display part.

Although embodiments have been described with reference to a number of illustrative embodiments thereof, it should be understood that other numerous modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. A laminated glass display for a vehicle, comprising:
An upper laminated glass;
a lower laminated glass having a recess adjacent to a vehicle body panel;
a plurality of adhesive films disposed between the upper laminated glass and the lower laminated glass;
a display part disposed between the plurality of adhesive films;
a dampener disposed in the recess; and
a molding disposed between the dampener and the vehicle body panel.

2. The laminated glass display of claim 1, wherein the dampener comprises an insulated buffer formed at one end thereof adjacent to the lower laminated glass.

3. The laminated glass display of claim 1, wherein the dampener comprises a plurality of protrusions extending towards the upper laminated glass.

4. The laminated glass display of claim 1, wherein the display part is electrically connected to a vehicle through a wiring harness.

5. The laminated glass display of claim 4, wherein the wiring harness is disposed between the vehicle body panel and a head lining.

6. The laminated glass display of claim 1, wherein an inner surface of the upper laminated glass is coated with a ceramic or a metal film.

7. The laminated glass display of claim 6, wherein an inner surface of the upper laminated glass contacting the dampener is coated with a ceramic or a metal film.

8. The laminated glass display of claim 7, wherein the metal film is a metal oxide film consisting of at least one of the oxides of aluminum, tin, zinc, and lead, tin (Sn), zinc (Zn), and lead.

9. The laminated glass display of claim 6, wherein the metal film is a metal oxide film consisting of at least one of the oxides of aluminum, tin, zinc, and lead.

10. The laminated glass display of claim 1, further comprising a sealant between the vehicle body panel and the dampener.

* * * * *